United States Patent [19]

Miyake et al.

[11] Patent Number: 5,193,082
[45] Date of Patent: Mar. 9, 1993

[54] OPTICAL/MAGNETIC COMPOSITE HEAD HAVING MAGNETIC AND OPTICAL HEADS IN ONE INTEGRATED UNIT

[75] Inventors: Tomoyuki Miyake, Tenri; Junichiro Nakayama, Nara; Hiroyuki Katayama, Nara; Akira Takahashi, Nara; Kenji Ohta, Kitakatsuragi, all of Japan

[73] Assignee: Sharp Kabushiki Kaisha, Osaka, Japan

[21] Appl. No.: 502,104

[22] Filed: Mar. 29, 1990

[30] Foreign Application Priority Data

Mar. 31, 1989 [JP]   Japan .................................. 1-81701

[51] Int. Cl.$^5$ .......................... G11B 13/04; G11B 7/12
[52] U.S. Cl. ...................................... 369/112; 369/13;
369/44.12; 369/44.14; 369/44.17; 369/110;
360/114
[58] Field of Search .............. 369/112, 13, 109, 44.11,
369/14, 15, 32, 44.14, 44.17, 110, 44.12;
360/114

[56]   References Cited

U.S. PATENT DOCUMENTS

| | | | |
|---|---|---|---|
| 4,706,232 | 11/1987 | Funada et al. ........................ | 360/59 |
| 4,914,643 | 4/1990 | Maeda .................... | 369/13 |
| 5,020,041 | 5/1991 | Nakao et al. ......................... | 360/114 |
| 5,022,018 | 6/1991 | Vogelgesang ........................ | 369/13 |

FOREIGN PATENT DOCUMENTS

| | | |
|---|---|---|
| 0306342 | 3/1989 | European Pat. Off. . |
| 58-118025 | 7/1983 | Japan . |
| 58-220204 | 12/1983 | Japan . |
| 60-217506 | 10/1985 | Japan . |
| 60-261052 | 12/1985 | Japan . |
| 61-39251 | 2/1986 | Japan . |
| 1-179248 | 7/1989 | Japan .................................. 360/114 |
| 1-273252 | 11/1989 | Japan ................................... 369/13 |
| 2-66755 | 3/1990 | Japan ................................. 360/114 |

OTHER PUBLICATIONS

S. Ura et al., "An Integrated-Optic Disk Pickup Device" OQe85-72 pp. 39-46.
S. Fujiwara et al., "Proton-Exchanged Fresnel Lenses in Ti:LiNbO$_3$ Waveguides", OQE84-83, pp. 1-7.

*Primary Examiner*—Tommy P. Chin
*Assistant Examiner*—Khoi Truong
*Attorney, Agent, or Firm*—Robert F. O'Connell

[57]   ABSTRACT

A photomagnetic composite head comprising a magnetic head and an optical head that are integrated into one unit, an optical waveguide path of the optical head being located in the surface of the magnetic head that faces a recording medium, and a laser beam that passes through the optical waveguide path being irradiated on a point on the recording medium where a magnetic field is impressed from the magnetic head, whereby recording can be performed under a condition in which the coercivity of the recording medium has been lowered by the laser beam, thus making it possible to achieve high density recording by using a recording medium with a high coercivity.

4 Claims, 2 Drawing Sheets

OPTICAL/MAGNETIC COMPOSITE HEAD HAVING MAGNETIC AND OPTICAL HEADS IN ONE INTEGRATED UNIT

BACKGROUND OF THE INVENTION

1. Field of the Invention

The present invention relates to a recording/playback head which can be used with storage mediums capable of optical and magnetic recording and reproducing, and more particularly to a recording/playback head used with magnetic disks; e.g., that used in hard disks.

2. Description of the Prior Art

In recent years, the amount of information has continued to increase steadily, and magnetic disks, optical disks and other mediums capable of relatively high-density recording are being used in place of conventional paper as storage mediums. Of these, greater recording densities are being required of those storage mediums with read/write capability.

Of the storage mediums with read/write capability, those that perform magnetic recording include the magnetic disks used in hard disks, etc., and greater recording density is achieved on these magnetic disks by improving the magnetic disk itself and the magnetic head.

The magnetic disk is being improved through the development of mediums with high, stable coercivity, and the materials being used include Co metal and Co-Ni, Co-Ti, Co-Fe, Co-Cr, Co-Ni-Cr and Co-P alloys.

Since the magnetic heads must be able to write information to a magnetic disk with a larger coercivity, they must be able to form a large magnetic field on the storage medium surface. Further, since the recording frequency cannot be lowered when recording on the magnetic disk, a floating type magnetic head is used, and the distance the head floats above the magnetic disk is minimized so that it is as close as possible to the storage medium surface.

However, at any frequency, there is a limit to how large a magnetic field can be generated by a floating type magnetic head, so magnetic disks with a very large coercivity cannot be used, which causes difficulties in performing recording at sufficiently high recording densities. Moreover, in configurations in which the magnetic head is as close as possible to the magnetic disk, not only does the effect of dust between the magnetic disk surface and the magnetic head become greater, but also there is a much greater danger of head crash.

SUMMARY OF THE INVENTION

The photomagnetic composite head of this invention, which overcomes the above-discussed and numerous other disadvantages and deficiencies of the prior art, comprises a floating type magnetic head that is supported in a non-contact position with regard to a rotatable recording medium and impresses a magnetic field on said recording medium so as to perform recording operations, an optical head that directs a laser beam emitted by a laser beam-generating means to an optical system part of an optical waveguide path via said optical waveguide and irradiates said laser beam on said recording medium, wherein said magnetic head and said optical head are integrated into one unit, said optical waveguide path of said optical head is located in the surface of said magnetic head facing said recording medium, and said laser beam directed by said optical system part is irradiated on a point on said recording medium where said magnetic field is impressed from said magnetic head.

In a preferred embodiment, the optical system part of said optical head comprises a convergence grating coupler that diffracts said laser beam that has passed through said optical waveguide path so as to converge on said recording medium.

In an embodiment, the photomagnetic composite head is retained at a constant distance from said recording medium by the suction force of air or the air pressure balanced with the suspension that occurs between said recording medium and said magnetic head when said recording medium is rotated.

When magnetically recording on a storage medium, the laser beam emitted by the laser beam-generating means passes through the waveguide of the optical waveguide path and is directed to the optical system of the optical waveguide path, and then it is irradiated on the point on the storage medium where the magnetic field is impressed by the magnetic recording head. By this means, the temperature of the point on the storage medium irradiated by the laser beam rises, causing the coercivity to drop. In this condition, recording is performed by the magnetic field impressed from the magnetic head. In this way, with the photomagnetic composite head, recording is performed under a condition where the coercivity of the storage medium is lowered, so that a high-density recording can be attained by using a storage medium with a high coercivity on which recording cannot be performed by a magnetic head alone. Moreover, integrating the magnetic head and optical head into one unit facilitates high-speed access during recording. As mentioned above, since recording is performed by a magnetic field in a state in which the coercivity of the storage medium is lowered, it is unnecessary for the photomagnetic composite head to be very close to the recording medium. Accordingly, the effect of dust between the magnetic disk and the photomagnetic composite head and the danger of head crash can be reduced.

Thus, the invention described herein makes possible the objectives of (1) providing a photo-magnetic composite head by which recording can be performed under conditions in which the coercivity of the recording medium has been lowered by the laser beam during magnetic recording on a recording medium, which makes it possible to achieve high density recording by using a recording medium with a high coercivity; and (2) providing a photomagnetic composite head by which recording and reading can be carried out on and from the magnetic disk without the photomagnetic composite head being very close to the recording medium, so that the effect of dust between the magnetic disk and the photomagnetic composite head and the danger of head crash can be reduced.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
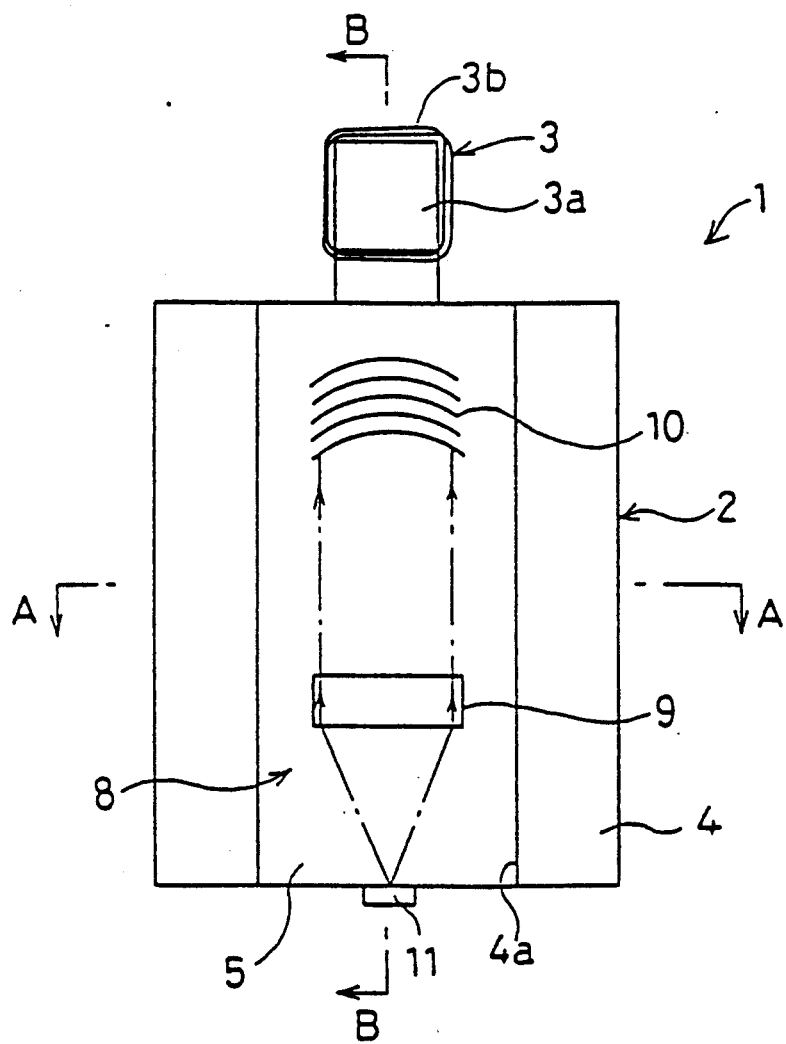
FIG. 1 is a plan view showing a photomagnetic composite head of this invention.
Figure 3:
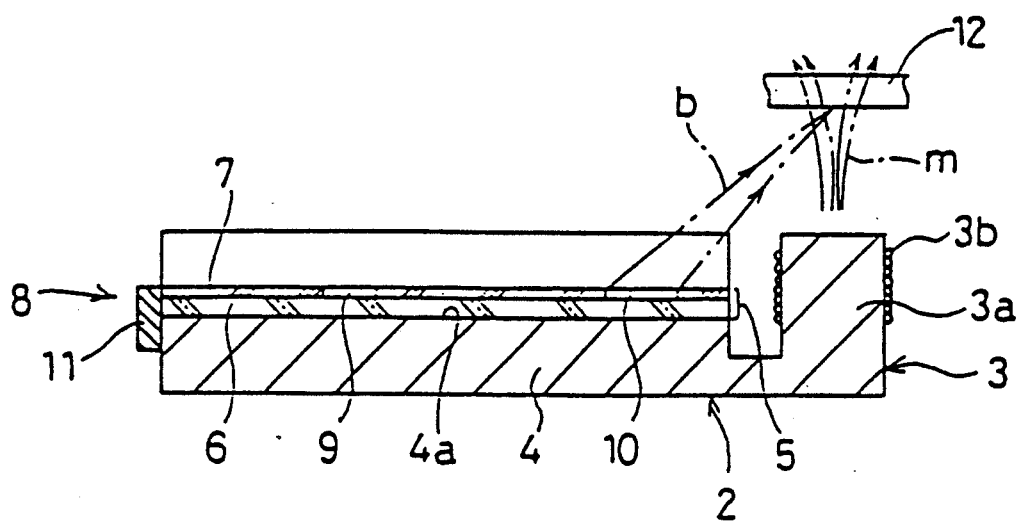
FIG. 3 is a sectional view taken along line B—B of FIG. 1.
Figure 4:
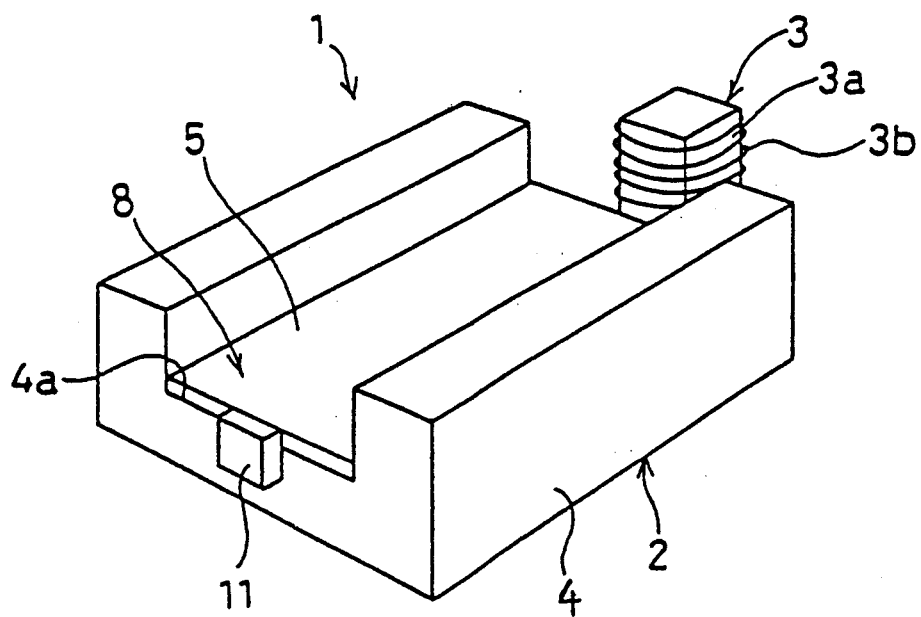
FIG. 4 is a perspective view showing the photomagnetic composite head of FIG. 1.

FIGS. 1, 3 and 4 show a photomagnetic composite head 1 of this invention, which comprises a magnetic head 2 and an optical head 8, both of which are integrated into one body, the magnetic head 2 is composed of a magnetic head part 3 and a slider part 4. These magnetic head part 3 and slider part 4 are formed into a single unit from a ferrite block made from a head material such as Mn-Zn.

The surface in the slider part 4 opposing a magnetic disk 12 functioning as a recording medium as shown in FIG. 3 has a groove 4a extending over its width from one end to the other. The magnetic head part 3 extends from the one end of the slider part 4 and has a coil 3b wrapped around a bar-shaped head core part 3a extending up, which impresses the magnetic field m on the storage medium surface of the magnetic disk 12. The head core part 3a of the magnetic head part 3 need not be formed from the same material as the slider part 4 and may be formed from some other head material.

Figure 2:
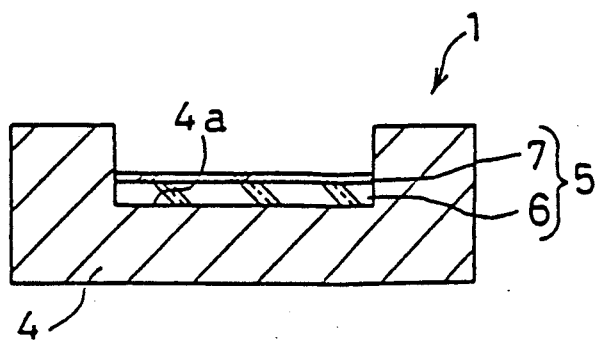
FIG. 2 is a sectional view taken along line A—A of FIG. 1.

The groove 4a in the above-mentioned slider part 4 has an optical waveguide path 5. As shown in FIGS. 2 and 3, this optical waveguide path 5 is constituted of a glass substrate 6 and a waveguide 7 which directs the laser beam and is formed from $LiNbO_3$ on the glass substrate 6. The optical system part of an optical head 8 is mounted on this waveguide 7. This optical system part is composed of a Fresnel lens 9 which makes parallel a laser beam that is emitted by the laser diode 11 and passes through the waveguide 7, and a convergence grating coupler 10 which diffracts the laser beam that has passed through the Fresnel lens 9 so as to converge on the magnetic disk 12. The point of convergence of the laser beam b on the magnetic disk 12 and the point where the magnetic field m is impressed by the magnetic head part 3 are the same.

A laser diode 11 is mounted as a laser beam generating means on the end opposite the magnetic head part 3 in the optical waveguide path 5. The above-mentioned optical waveguide path 5, Fresnel lens 9, convergence grating coupler 10 and laser diode 11 make up the optical head 8.

The photomagnetic composite head 1 with the above configuration is retained by a suspension (not shown) to form a floating type head which does not come in contact with the magnetic disk 12 used as the storage medium. The photomagnetic composite head 1 is retained at a distance of several microns from the magnetic disk 12 by the suction force of air that occurs between the magnetic disk 12 and the slider part 4 of the photomagnetic composite head 1 when the magnetic disk 12 is rotated. The distance between the magnetic disk 12 and the photomagnetic composite head 1 is determined depending upon the surface area of the slider part 4, the weight of the photomagnetic composite head 1, the number of revolution of the magnetic disk 12, the elastic modulus of the suspension, and/or the like. By using a floating type construction, the distance between the photomagnetic composite head 1 and the magnetic disk 12 is kept constant. Therefore, the distance between the photomagnetic composite head 1 and the magnetic disk 12 is known, so that it is easy to match up the convergence point of the laser beam b and the point where the magnetic field m is impressed by the magnetic head 2.

The storage medium part of the magnetic disk 12 is formed from Co metal, or Co-Ni, Co-Ti, Co-Fe, Co-Cr, Co-Ni-Cr or Co-P alloys and has a high coercivity.

In the above configuration, the magnetic disk 12 is rotated and the magnetic head 2 and optical head 8 are operated while recording to the magnetic disk 12 by this photomagnetic composite head 1. By this method, a modulated magnetic field m based on the recording signal is impressed on the magnetic disk 12 by the magnetic head 2, and at the same time, a laser beam b is irradiated by the optical head 8 on the point on the magnetic disk 12 where the magnetic field m is impressed by the magnetic head 2. The laser beam emitted by the laser diode 11 of the optical head 8 at this time passes through the waveguide 7 of the optical waveguide path 5, and is made parallel by the Fresnel lens 9, after which it is diffracted by the convergence grating coupler 10 so as to be converged on the magnetic disk 12.

When the laser beam b is irradiated on the magnetic disk 12 as described above, the temperature of the point irradiated by the laser beam b rises and the coercivity drops, and recording is performed by the magnetic field m impressed on the point by the magnetic head 2. In this configuration in which recording is performed when the magnetic disk 12 is irradiated with a laser beam b and the coercivity drops, a magnetic disk 12 with a large coercivity can be used, thereby facilitating high density recording.

Reproduction is performed by the magnetic head 2 reading the information recorded on the magnetic disk 12. This operation is performed without operating the optical head 8 and lowering the coercivity of the magnetic disk 12.

While the magnetic disk 12 is rotating, the suction force of air that occurs between the magnetic disk 12 and the slider part 4 retains the photomagnetic composite head 1 at a distance of several microns from the magnetic disk 12. This photomagnetic composite head 1 performs magnetic recording to the magnetic disk 12 while the coercivity is reduced by the laser beam b, so that it is not necessary to bring the photomagnetic composite head 1 to within 1 $\mu$m from the magnetic disk 12 as in the case of magnetic recording with only a magnetic disk 12, but if the distance between the magnetic disk 12 and the magnetic head 2 is too large during reading of the magnetic disk 12, the reading sensitivity drops, so that the gap therebetween is set to the above-mentioned distance. Since the distance therebetween is made wider, the effect of dust between the magnetic disk 12 and the photomagnetic composite head 1 and the danger of head crash can be reduced.

Since the optical waveguide path 5 is formed in the groove 4a of the slider part 4, it is protected even if the magnetic head 2 should suffer head crash. Moreover, the integration of the magnetic head 2 and optical head 8 into a single unit facilitates high-speed access during recording.

As described above, according to this invention, recording can be performed under conditions in which the coercivity of the recording medium has been lowered by the laser beam during magnetic recording on a recording medium, thus making it possible to achieve high density recording by using a recording medium with a high coercivity. Moreover, since recording and reading can be performed on and from the magnetic disk, respectively, without placing the photomagnetic composite head too closely to the recording medium, the effect of dust between the magnetic disk and the photomagnetic composite head and the danger of head crash can be reduced.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An optical/magnetic composite head comprising
   a floating type magnetic head that is supported in a non-contact position with regard to a rotatable recording medium and impresses a magnetic field on said recording medium so as to perform recording operations,
   an optical head located on said magnetic head facing said recording medium and said optical head including
   a laser beam-generating means for directing a laser beam on to said recording medium via an optical waveguide path, wherein said magnetic head and said optical head are integrated into one unit, said laser beam being directed so as to irradiate a point on said recording medium wherein said magnetic field is impressed from said magnetic head.

2. An optical/magnetic composite head according to claim 1, wherein said optical head comprises a convergence grating coupler that diffracts said laser beam that has passed through said optical waveguide path so as to converge said beam on to said recording medium.

3. An optical/magnetic composite head according to claim 1, wherein said composite head is retained at a constant distance from said recording medium by the suction force of air or the air pressure balanced with the suspension that occurs between said recording medium and said magnetic head when said recording medium is rotated.

4. An optical/magnetic composite head according to claim 1 wherein said magnetic head has a slider part and said optical head is located on a surface of said slider part facing said recording medium.

* * * * *